United States Patent
Ji et al.

(10) Patent No.: US 10,630,191 B2
(45) Date of Patent: Apr. 21, 2020

(54) TRANSFORMER AND LLC RESONANT CONVERTER HAVING THE SAME

(71) Applicant: SOLUM CO., LTD., Yongin-si (KR)

(72) Inventors: Sang-keun Ji, Seoul (KR); Sang-kyoo Han, Daejeon (KR); Cheol-wan Park, Seoul (KR); Dong-kyun Ryu, Seoul (KR); Heung-gyoon Choi, Suwon-si (KR)

(73) Assignee: SOLUM CO., LTD., Yongin-si (KR)

( * ) Notice: Subject to any disclaimer, the term of this patent is extended or adjusted under 35 U.S.C. 154(b) by 0 days.

(21) Appl. No.: 15/972,079

(22) Filed: May 4, 2018

(65) Prior Publication Data
US 2018/0342953 A1 Nov. 29, 2018

(30) Foreign Application Priority Data
May 26, 2017 (KR) .................. 10-2017-0065568

(51) Int. Cl.
*H02M 3/335* (2006.01)
*H02M 3/338* (2006.01)
(Continued)

(52) U.S. Cl.
CPC .......... *H02M 3/3382* (2013.01); *H01F 27/06* (2013.01); *H01F 27/306* (2013.01); *H02M 3/33561* (2013.01); *H02M 2001/0032* (2013.01)

(58) Field of Classification Search
CPC .... H01F 21/02; H01F 21/04; H01F 2027/065; H01F 27/06; H01F 27/306; H01F 27/26;
(Continued)

(56) References Cited

U.S. PATENT DOCUMENTS

2010/0067263 A1  3/2010 Qian et al.
2012/0326829 A1* 12/2012 Matsuda ............. H01F 27/2823
                                                        336/212
(Continued)

FOREIGN PATENT DOCUMENTS

EP          1 710 900 A2    10/2006
EP          1 732 198 A2    12/2006
(Continued)

OTHER PUBLICATIONS

Office Action (dated Mar. 29, 2019) issued by the Korean Patent Office for Korean Patent Application No. 10-2017-0065568 which was filed on May 26, 2017.
(Continued)

*Primary Examiner* — Bryan R Perez

(57) ABSTRACT

A transformer and an LLC resonant converter are provided. The transformer includes first and second cores configured to include a pair of outer foots and a middle foot positioned between the outer foots, and to induce a magnetic field formation; first and second inductor winding parts configured to include a conductor surrounding a circumference of each of the pair of outer foots of the first core, and to be connected in series with each other; and first and second transformer winding parts configured to include a conductor surrounding a circumference of each of the pair of outer foots of the second core, wherein the pair of outer foots of the first core face the pair of outer foots of the second core, the middle foot of the first core faces the middle foot of the second core, and the first core and the second core are disposed to be spaced apart from each other.

3 Claims, 8 Drawing Sheets

(51) Int. Cl.
*H01F 27/06* (2006.01)
*H01F 27/30* (2006.01)
*H02M 1/00* (2006.01)

(58) Field of Classification Search
CPC . H01F 27/30; H02M 3/3382; H02M 3/33561; H02M 2001/0032
See application file for complete search history.

(56) References Cited

U.S. PATENT DOCUMENTS

| | | | |
|---|---|---|---|
| 2013/0294113 | A1 | 11/2013 | Liang et al. |
| 2013/0342942 | A1* | 12/2013 | Wohlforth ............ H01F 27/345 361/56 |
| 2014/0306788 | A1* | 10/2014 | Umetani ............... H01F 27/385 336/173 |

FOREIGN PATENT DOCUMENTS

| JP | 2010-267816 A | 11/2010 |
|---|---|---|
| JP | 2013-236531 A | 11/2013 |
| KR | 91-002376 B1 | 11/1989 |
| KR | 10-0586978 B1 | 6/2006 |
| KR | 10-2013-0014972 A | 2/2013 |

OTHER PUBLICATIONS

EPO Office Action & Search report dated Oct. 31, 2018.

\* cited by examiner

TRANSFORMER AND LLC RESONANT
CONVERTER HAVING THE SAME

CROSS-REFERENCE TO RELATED APPLICATIONS

This application claims priorities from Korean Patent Application No. 10-2017-0065568, filed on May 26, 2017 in the Korean Intellectual Property Office, the disclosure of which is incorporated herein by reference in its entirety.

BACKGROUND OF THE INVENTION

Field of the Invention

Apparatuses consistent with the present disclosure relate to a transformer and an LLC resonant converter having the same, and more particularly, to an LLC resonant converter including only one magnetic element without adding external elements for resonance in the LLC resonant converter.

Description of the Related Art

In order to implement a high power density power source, an LLC resonant converter which may perform a zero voltage switching (ZVS) operation in a full load region and is advantageous in a high frequency driving is used. The LLC resonant converter allows a switching frequency and a resonance frequency to operate at the same point by a ratio of the number of turns of a transformer and an appropriate design of a resonance capacitor, a resonance inductor, and a magnetized inductor which are essential elements for a resonance operation to minimize a variation of an operation frequency for a wide load variation, thereby securing a stable operation and control. The resonance inductor is generally implemented as a leakage inductor of the transformer.

As a size of the transformer is reduced and elements for implementing a high power density power conversion apparatus are integrated, leakage inductance which may be used as the resonance inductor is not often sufficiently secured. In particular, in a case in which a planar transformer rather than a general winding type transformer is used to further reduce a physical size of the transformer, since the leakage inductance is small in the order of several tens to several hundreds of nH, a separate external inductor is required to secure the resonance inductor. As a result, due to an increase in a size of a system and an increase in the number of parts, it is difficult to implement the high power density power conversion apparatus.

SUMMARY OF THE INVENTION

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a transformer that does not require a separate external inductor and an LLC resonant converter having the same.

According to an aspect of the present disclosure, a transformer includes first and second cores configured to include a pair of outer foots and a middle foot positioned between the outer foots, and to induce a magnetic field formation; first and second inductor winding parts configured to include a conductor surrounding a circumference of each of the pair of outer foots of the first core, and to be connected in series with each other; and first and second transformer winding parts configured to include a conductor surrounding a circumference of each of the pair of outer foots of the second core, wherein the pair of outer foots of the first core face the pair of outer foots of the second core, the middle foot of the first core faces the middle foot of the second core, and the first core and the second core are disposed to be spaced apart from each other.

When a current is applied to the first and second inductor winding parts, the first and second inductor winding parts may generate a middle foot inductance $L_c$ by magnetic fluxes formed in the middle foots of the first and second cores, and may generate first and second outer foot inductances $L_{o1}$ and $L_{o2}$ by magnetic fluxes formed in the outer foots of the first and second cores.

The middle foot inductance may be determined according to a spaced distance between the middle foots of the first and second core, a cross section area of the middle foot, and the number of turns of the first and second inductor winding parts surrounding the outer foots of the first core, and the first and second outer foot inductances may be determined according to a spaced distance between the outer foots of the first and second core, a cross section area of the outer foot, and the number of turns of the first and second inductor winding parts surrounding the outer foots of the first core.

The number of turns of the first inductor winding part and the number of turns of the second inductor winding part may be equal to each other.

When a voltage is applied to the first and second inductor winding parts and the second outer foot inductance and the middle foot inductance operate resonance inductors, the first outer foot inductance may operate a magnetized inductor, and when the voltage is not applied to the first and second inductor winding parts and the first outer foot inductance and the middle foot inductance operate the resonance inductors, the second outer foot inductance may operate the magnetized inductor.

According to another aspect of the present disclosure, an LLC resonant converter includes a switching part configured to supply power according to a switching control signal; a transformer configured to be connected in series with a resonance capacitor connected to the switching part; and a rectifier configured to be connected to the transformer, wherein the transformer includes: first and second cores configured to include a pair of outer foots and a middle foot positioned between the outer foots, and to induce a magnetic field formation; first and second inductor winding parts configured to include a conductor surrounding a circumference of each of the pair of outer foots of the first core, and to be connected in series with each other; and first and second transformer winding parts configured to include a conductor surrounding a circumference of each of the pair of outer foots of the second core, wherein the pair of outer foots of the first core face the pair of outer foots of the second core, the middle foot of the first core faces the middle foot of the second core, and the first core and the second core are disposed to be spaced apart from each other.

The number of turns of the first inductor winding part and the number of turns of the second inductor winding part may be equal to each other.

The switching part may be configured in a half-bridge or a full-bridge.

According to the diverse exemplary embodiments of the present disclosure, when the high power density power conversion apparatus is implemented, the leakage inductance does not occur. Therefore, in a case in which it is difficult to secure the resonance inductor, it is possible to provide the transformer enabling all resonant LLC operations only with one magnetic element without adding the separate external inductor, and the LLC resonant converter having the same.

In addition, since a designer may set the equivalent resonance inductance and the magnetized inductance which are directly involved in the resonance operation, the zero voltage switching is secured regardless of an input and output specification, thereby enabling the high frequency driving and securing a sufficient gain, thus facilitating a stably output power control.

BRIEF DESCRIPTION OF THE DRAWING FIGURES

The above and/or other aspects of the present disclosure will be more apparent by describing certain exemplary embodiments of the present disclosure with reference to the accompanying drawings, in which.

Figure 6:
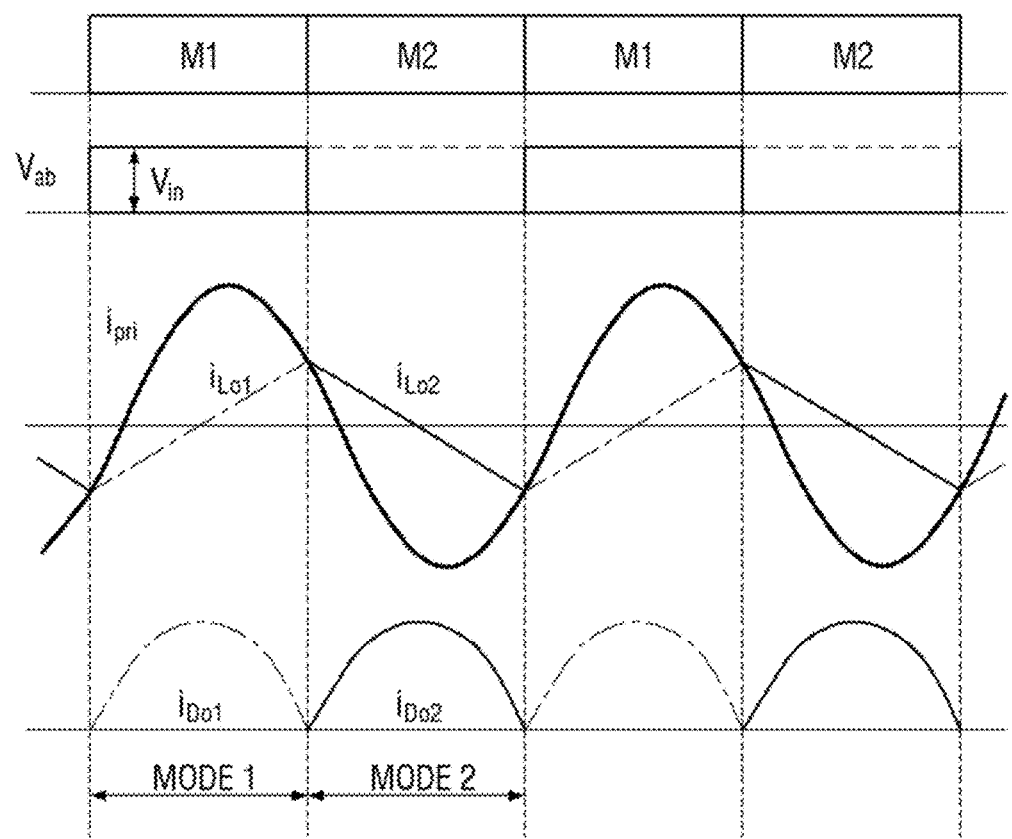
Figure 7:
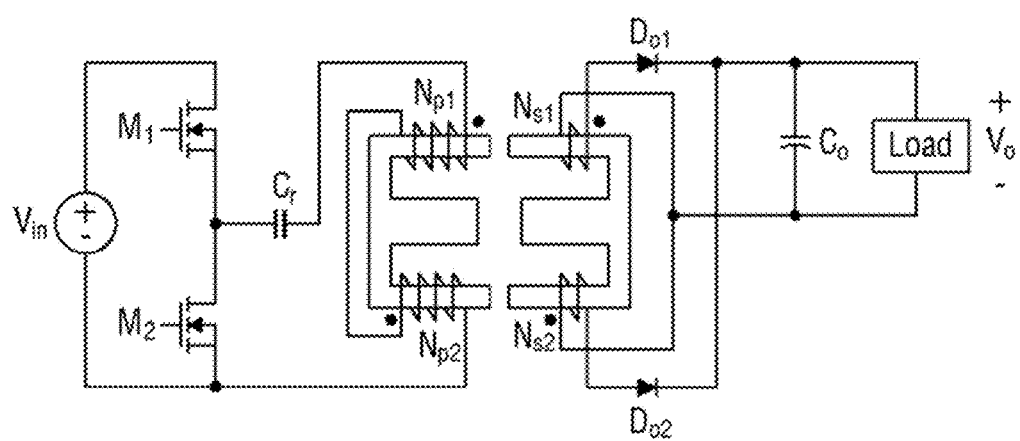
Figure 8:
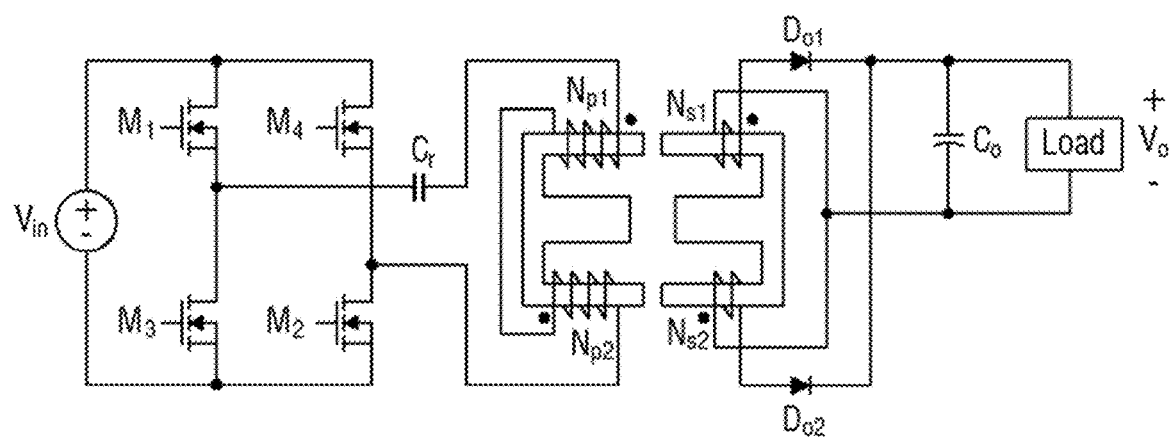

FIG. 6 is a graph illustrating an input voltage, an amount of current of a primary circuit, and an amount of current of a secondary circuit according to an operation mode of the LLC resonant converter according to an exemplary embodiment of the present disclosure; and FIGS. 7 and 8 are diagram cases in which the transformer according to an exemplary embodiment of the present disclosure is applied to half-bridge and full-bridge LLC resonant converters.

DETAILED DESCRIPTION OF THE EXEMPLARY EMBODIMENTS

Hereinafter, diverse exemplary embodiments of the present disclosure will be described with reference to the accompanying drawings. However, it is to be understood that technologies mentioned in the present disclosure are not limited to specific exemplary embodiments, but include all modifications, equivalents, and substitutions according to exemplary embodiments of the present disclosure. Throughout the accompanying drawings, similar components will be denoted by similar reference numerals.

In addition, expressions "first", "second", or the like, used in the present disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the 'first' component may be named the 'second' component and the 'second' component may also be similarly named the 'first' component without departing from the scope of the present disclosure.

Terms used in the present disclosure may be used only in order to describe specific exemplary embodiments rather than restricting the scope of other exemplary embodiments. Singular forms may include plural forms unless the context clearly indicates otherwise. Terms used in the present specification including technical and scientific terms have the same meanings as those that are generally understood by those skilled in the art to which the present disclosure pertains. Terms defined by a general dictionary among terms used in the present disclosure may be interpreted as meaning that are the same as or similar to meanings within a context of the related art, and are not interpreted as ideal or excessively formal meaning unless clearly defined in the present disclosure. In some cases, terms may not be interpreted to exclude exemplary embodiments of the present disclosure even though they are defined in the present disclosure.

Hereinafter, exemplary embodiments of the present disclosure will be described in detail with reference to the accompanying drawings.

In a general LLC resonant converter, it is general that a magnetized inductor $L_p$ and a resonance inductor $L_r$ are not added with a separate inductor and the resonance inductor $L_r$ is implemented as a leakage inductor of a transformer. The resonance inductor $L_r$ resonates together with a resonance capacitor $C_r$.

Since a planar transformer has the degree of magnetic coupling between a primary side winding and a secondary side winding about two to three times higher than that of a winding type transformer, it has a very small leakage inductance of several tens to several hundreds of nH, which serves as the resonance inductor $L_r$. Therefore, in order to secure the resonance inductor $L_r$ having a sufficient size capable of guarantying a voltage gain required by the LLC resonant converter, it is needed to use a separate external inductor. Hereinafter, a transformer capable of securing the resonance inductor $L_r$ without adding the separate external inductor, and an LLC resonant converter will be described.

Figure 1:
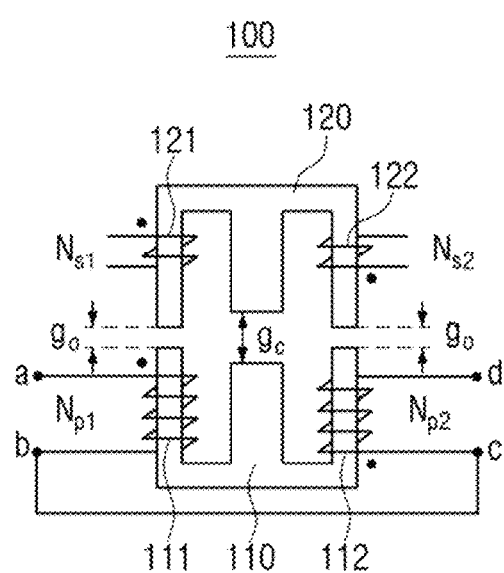
FIG. 1 is a circuit diagram illustrating a coupling relationship between a core of a transformer and a winding part according to an exemplary embodiment of the present disclosure.
Figure 2:
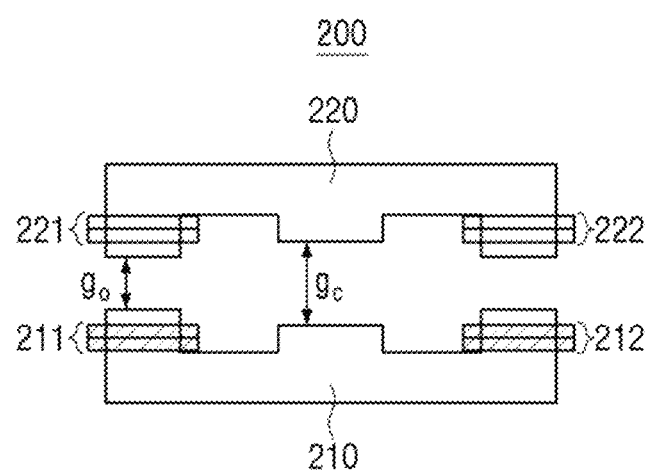
FIG. 2 is a diagram illustrating a case in which a transformer according to an exemplary embodiment of the present disclosure is applied as a planar transformer.

FIG. 1 is a circuit diagram illustrating a coupling relationship between a core of a transformer and a winding part according to an exemplary embodiment of the present disclosure and FIG. 2 is a diagram illustrating a case in which a transformer according to an exemplary embodiment of the present disclosure is applied as a planar transformer.

The resonance inductor $L_r$ and the magnetized inductor $L_p$ are essential components in the LLC resonant converter. The magnetized inductor $L_p$ of the transformer according to the present disclosure may be used as the magnetized inductor $L_p$ of the LLP resonant converter as it is, and may be utilized for the resonance inductor $L_r$. Therefore, even in a case in which the leakage inductance hardly occurs, the separate external inductor is not required.

Referring to FIG. 1, the transformer 100 may include first and second cores 110 and 120 provided to induce a magnetic field formation, first and second inductor winding parts 111 and 112 wound around a pair of outer foots of the first core 110, and first and second transformer winding parts 121 and 122 wound around a pair of outer foots of the second core 120.

Referring to FIG. 2, an example applied to the planar transformer 200 is illustrated. First and second cores 210 and 220 are planar cores, and first and second inductor winding parts 211 and 212 are stacked on an outer foot of the first core 210. The first and second inductor winding parts 211 and 212 may be formed of sheet copper, a PCB pattern, or the like. The first and second inductor winding parts 211 and 212 are formed around a magnetic core after stacking the PCB pattern or the sheet copper including a spiral copper pattern. In order to secure the number of primary windings surrounding the first core 210, the first and second inductor parts 211 and 212 may be formed by stacking a plurality of sheet coppers or PCBs.

An insulator may be included between the stacked PCB patterns or sheet coppers of the winding parts. The PCB may be formed to maintain a width of a copper pattern and an interval between the copper patterns to be constant, and the sheet copper may be formed to a thickness of a copper wire and an interval between the copper wires to be constant. Thereby, the planar transformer may have small proximity effect and skin effect in a high frequency region to reduce conduction loss, and may minimize parasitic inductance such as the leakage inductance to thereby minimize power loss of the converter.

In the same manner as the first core 210, first and second transformer winding parts 221 and 222 are stacked on an outer foot of a second core 220. As described above, the first and second inductor winding parts include a conductor surrounding a circumference of each of the pair of outer foots of the first core. In addition, the first and second inductor winding parts include a conductor surrounding a circumference of each of the pair of outer foots of the second core.

Referring to FIG. 1, the first core 110 and the second core 120 of the transformer according to the present disclosure face each other to be symmetrical with each other, and are disposed to be spaced apart from each other by a predetermined distance. The respective cores are disposed to be spaced apart from each other to have a gap $g_c$ between middle foots thereof and to have a gap $g_o$ between outer foots thereof.

In the case of planar transformer, a thickness of the insulator stacked on the PCB or the sheet copper may form the intervals of the first and second cores 210 and 220. Therefore, the first and second cores 210 and 220 may have the gap $g_c$ of the middle foots and the gap $g_o$ of the outer foots.

Ends of the first and second inductor winding parts 111 and 112 are connected to each other to form a primary side circuit of the LLC resonant converter.

Here, in the general resonant converter, the numbers $N_{p1}$ and $N_{p2}$ of turns of the first and second inductor winding parts 111 and 112 are equal to $N_p$, and the numbers $N_{s1}$ and $N_{s2}$ of turns of the first and second transformer winding parts 121 and 122 are equal to $N_s$.

In the LLC resonant converter to which the transformer according to an exemplary embodiment of the present disclosure is applied, when a positive voltage is applied to a dot of the first and second inductor winding parts 111 and 112, power is transferred to an output side through the first transformer winding part 121. In this case, the first and second inductor winding parts 111 and 112 operate as the transformer, the first inductor winding part 111 operates as the magnetized inductor $L_p$, and the second inductor winding part 112 operates as the resonance inductor $L_r$. Therefore, the LLC resonant converter to which the transformer according to an exemplary embodiment of the present disclosure is applied may not have a separate external inductor or a large leakage inductor for resonance operation. In addition, since the LLC resonant converter according to an exemplary embodiment of the present disclosure may implement all operations such as a zero switching or an output power control, the transformer 100 may be miniaturized.

Figure 3:
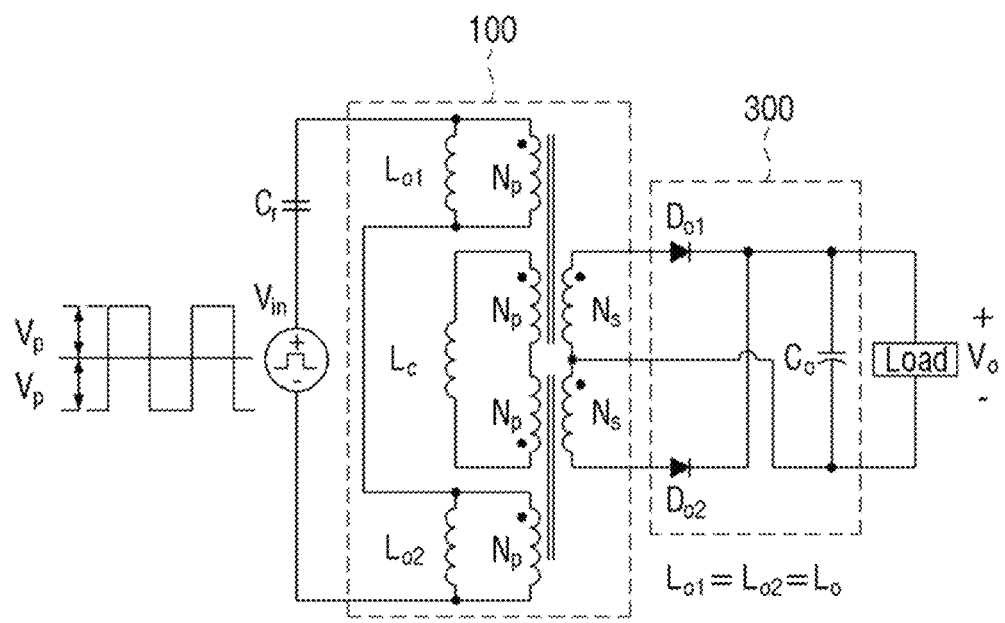
FIG. 3 is a circuit diagram illustrating an LLC resonant converter implemented to include the transformer according to an exemplary embodiment of the present disclosure.

FIG. 3 is a circuit diagram illustrating an LLC resonant converter implemented to include the transformer according to an exemplary embodiment of the present disclosure.

Referring to FIG. 3, an LLC resonant converter equivalent circuit including the transformer 100 and a rectifier 300 is illustrated.

The transformer 100 represents an equivalent circuit of FIGS. 1 and 2. In a case in which the degree of magnetic coupling of the transformer is high or in the case of planar transformer, it is difficult for the transformer to secure leakage inductance. The equivalent circuit of FIG. 3 illustrates a magnetic circuit of the transformer 100 according to an exemplary embodiment of the present disclosure as an equivalent electric inductance model, under assumption that the leakage inductance negligibly occurs.

When a current is applied to the first and second inductor winding parts 111 and 112, the first and second inductor winding parts 111 and 112 generate middle foot inductance $L_c$ by magnetic flux formed in middle foots of the first and second core, and generate first and second outer foot inductances $L_{o1}$ and $L_{o2}$ by magnetic flux formed in the outer foots of the first and second cores.

The number of turns of the outer foot and the middle foot of the first core, inductances $L_c$ and $L_o$ according to the gaps of the first core and the second core are determined by Equation below.

$$L_c = \mu \frac{A_c N p_1^2}{g_c}$$

$$L_o = \mu \frac{A_o N p_1^2}{g_o}$$

It is assumed that the numbers of turns $N_{p1}$ and $N_{p2}$ of the first and second inductor winding parts 111 and 112 are equal to each other. The middle foot inductance $L_c$ is determined by a spaced distance between the middle foots of the first and second cores 110 and 120, that is, the gap $g_c$ of the middle foot, a cross section area $A_c$ of the middle foot, the numbers of turns $N_{p1}$ and $N_{p2}$ of the first and second inductor winding parts 111 and 112 surrounding the outer foot of the first core 110, and magnetic permeability ($\mu$) of air.

The outer foot inductance $L_o$ is determined according to the gap $g_o$ of the outer foots of the first and second cores 110 and 120, and a cross section area $A_o$ of the outer foot.

The first and second inductor winding parts 111 and 112 of the transformer 100 are connected in series with the resonance capacitor $C_r$ and a square wave power source $V_{in}$, and the first and second transformer winding parts 121 and 122 of the transformer 100 are connected to the rectifier.

When an input voltage of the square wave power source $V_{in}$ has a positive polarity, the current enters the dot of the transformer 100, a first outer foot inductance $L_{o1}$ operates the magnetized inductor $L_p$, and a parallel connection portion of a second outer foot inductance $L_{o2}$ and the middle foot inductance $L_c$ operates the resonance inductor. In addition, when the input voltage of the square wave power source $V_{in}$ has a negative polarity, the current exits from the dot of the transformer 100, a second outer foot inductance $L_{o2}$ operates the magnetized inductor $L_p$, and a parallel connection portion of the first outer foot inductance $L_{o1}$ and the middle foot inductance $L_c$ serves as the resonance inductor $L_r$.

Therefore, the LLC resonant converter according to an exemplary embodiment of the present disclosure performs the same operation as the conventional LLC resonant converter by the middle foot inductance $L_c$ and the first and second outer foot inductances $L_{o1}$ and $L_{o2}$ without requiring the separate external inductor or the large leakage inductance for resonance operation unlike the conventional transformer, and may control an output power.

Figure 4A:
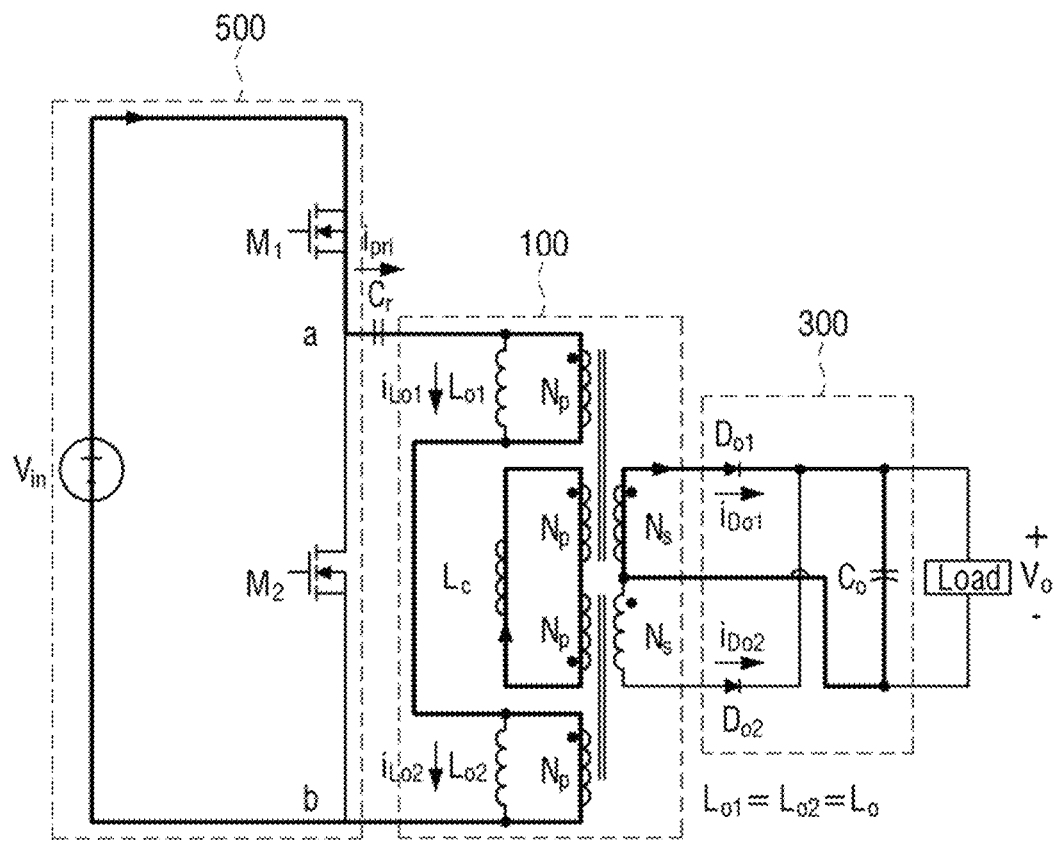
FIGS. 4A and 4B are a circuit diagram and an equivalent circuit diagram illustrating a current flow of the LLC resonant converter when a voltage is applied to the transformer according to an exemplary embodiment of the present disclosure.
Figure 4B:
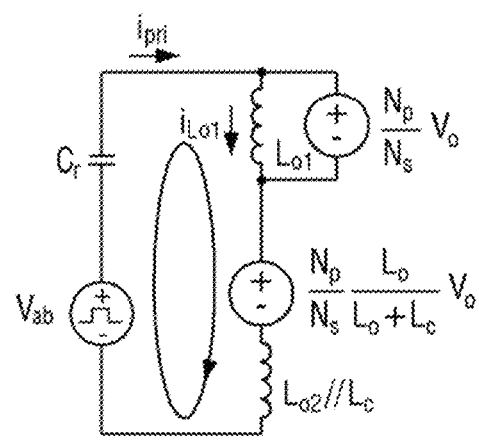
Figure 5A:
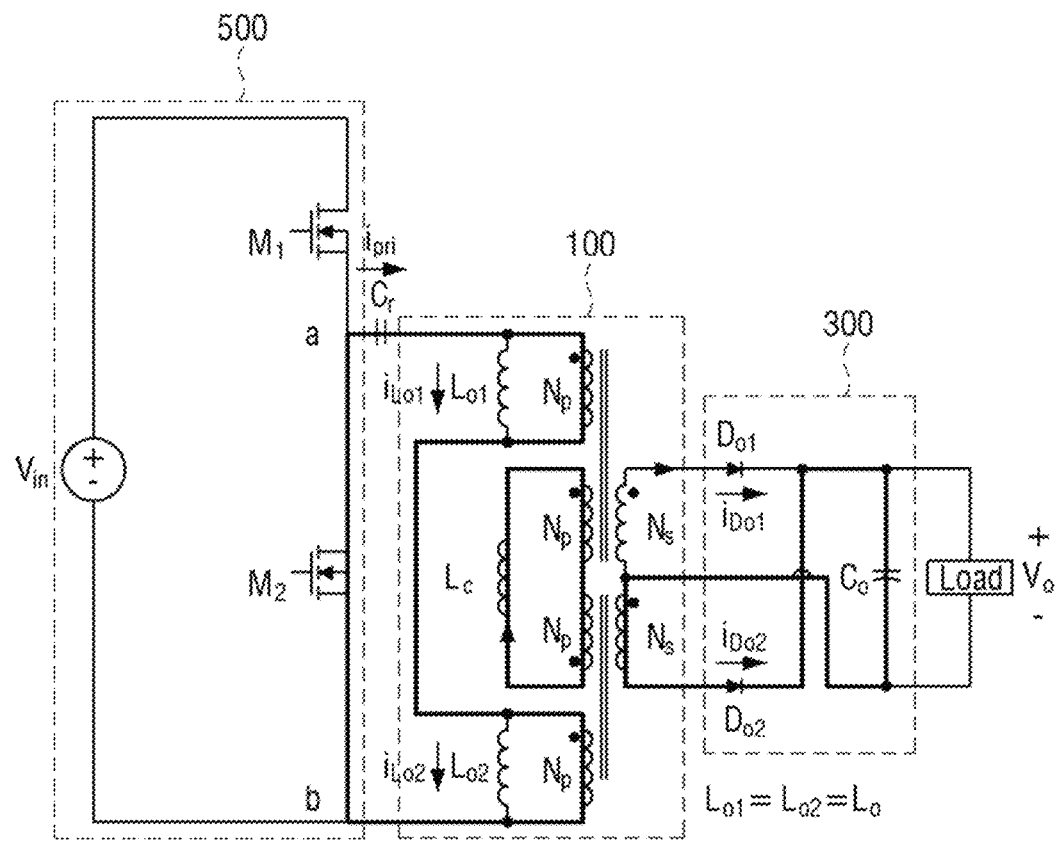
FIGS. 5A and 5B are a circuit diagram and an equivalent circuit diagram illustrating a current flow of the LLC resonant converter when a voltage is not applied to the transformer according to an exemplary embodiment of the present disclosure.
Figure 5B:
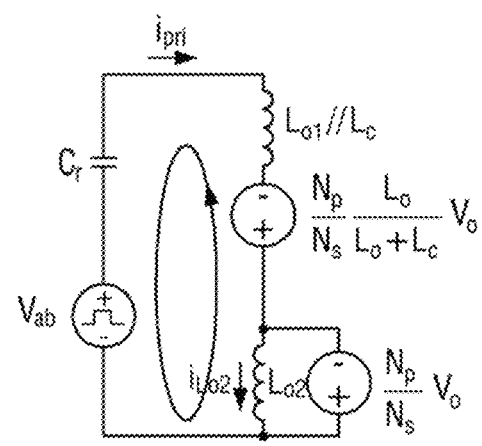

FIGS. 4A and 4B are a circuit diagram and an equivalent circuit diagram illustrating a current flow of the LLC resonant converter when a voltage is applied to the transformer according to an exemplary embodiment of the present disclosure and FIGS. 5A and 5B are a circuit diagram and an equivalent circuit diagram illustrating a current flow of the LLC resonant converter when a voltage is not applied to the transformer according to an exemplary embodiment of the present disclosure.

Referring to FIGS. 4A to 5B, the switching part 500 and the resonance capacitor $C_r$ are connected in series with the primary side circuit of the transformer 100, and the secondary side circuit of the transformer 100 is connected to the rectifier 300.

The switching part 500 may include switches $M_1$ and $M_2$ having an input power source and a semiconductor element such as MOSFET. The transformer and the capacitor are connected to a node (a) between the switches $M_1$ and $M_2$ and a node (b) between the voltage part and the switch $M_2$. The switching-off of the switches $M_1$ and $M_2$ alternately operates. The rectifier 300 is connected to the secondary side circuit of the transformer and a load is connected to an end of the rectifier. An output voltage $V_o$ is a voltage applied to the load.

If the number of turns of the first inductor winding part 111 wound around the outer foot of the first core 110 is equal to the number of turns of the second inductor winding part 112, the first and second outer foot inductances $L_{o1}$, $L_{o2}$ are equal to each other.

Hereinafter, the transformer 100 and the LLC resonant converter according to an exemplary embodiment of the present disclosure having the above-mentioned configuration operate according to the following process.

Referring to FIG. 4A, a mode 1 refers to a state in which the switch M1 of the LLC resonant converter according to an exemplary embodiment of the present disclosure is turned on and a positive (+) AC square wave input voltage is applied to a transformer inductance model. In the case of mode 1, a current flow in the LLC resonant converter circuit and an equivalent model thereof are as illustrated in FIG. 4B.

FIG. 6 is a graph illustrating an input voltage, an amount of current of a primary circuit, and an amount of current of a secondary circuit according to an operation mode of the LLC resonant converter according to an exemplary embodiment of the present disclosure.

In the case of mode 1, as the switch $M_1$ is turned on and a positive input voltage is applied to a voltage between a and b, a positive voltage is applied to a dot of the primary side winding of the transformer 100 and the power is transferred to an output load through a first diode $D_{01}$ of the rectifier 300. In this case, the output voltage is applied to the first outer foot inductance in consideration of a turn ratio of the transformer 100. Therefore, the current flowing in the first outer foot inductance is linearly increased according to the output voltage and is not involved in the resonance operation.

Referring to the mode 1 ($M_1$) of FIG. 6, it may be seen that the current flowing in the first outer foot inductance $L_{o1}$ is linearly increased.

Meanwhile, the second diode $D_{o2}$ of the rectifier 300 does not conduct, the middle foot inductance $L_c$ and the second outer foot inductance $L_{o2}$ are connected in parallel to each other and start a resonance operation with the resonance capacitor $C_r$, and the resonance frequency is determined by the resonance capacitor, and $L_{o2}//L_c$ that the second outer foot inductance $L_{o2}$ and the middle foot inductance $L_c$ are connected in parallel to each other. Therefore, in the mode 1, the first outer foot inductance $L_{o1}$ serves as the magnetized inductor $L_p$ of the general LLC resonant converter, and $L_{o2}//L_c$ that the second outer foot inductance $L_{o2}$ and the middle foot inductance $L_c$ are connected in parallel to each other operates the resonance inductor $L_r$ or the leakage inductor of the general LLC resonant converter. The mode 1 ends when the resonance operation of the resonance capacitor $C_r$, the middle foot inductance $L_c$, and the second outer foot inductance $L_{o2}$, the switch $M_1$ is turned off, and the switch $M_2$ is turned on.

Referring to FIG. 5A, the mode 2 starts when the switch $M_2$ is turned on, and corresponds to a case in which a voltage of 0V is applied between a and b unlike the mode 1. In this case, a current flow and an equivalent model in the circuit are as illustrated in FIG. 5B. In the mode 2, the switch $M_2$ is turned on such that the voltage of 0V is applied between a and b.

The voltage stored in the resonance capacitor $C_r$ in the mode 1 is applied to the primary side of the transformer 100. Thereby, a positive voltage is applied to a no-pot portion of the transformer. A power transfer to the output load through the second diode $D_{o2}$ of the rectifier occurs.

In this case, since the output voltage is applied to the second outer foot inductance $L_{o2}$ in consideration of the turn ratio and the positive voltage is applied to the non-dot portion of the transformer, the current flowing in the second outer foot inductance $L_{o2}$ is linearly decreased according to the output voltage.

Referring to the mode 2 ($M_2$) of FIG. 6, it may be seen that the current flowing in the second outer foot inductance $L_{o2}$ is linearly decreased.

In this case, since the first diode $D_{o1}$ of the rectifier does not conduct, the first outer foot inductance $L_{o1}$ and the middle foot inductance $L_c$ are connected to each other and starts the resonance operation of the resonance capacitor $C_r$. In this case, the resonance frequency is determined by $L_{o1}//L_c$ that the first outer foot inductance $L_{o1}$ and the middle foot inductance $L_c$ are connected to each other, and the resonance capacitor $C_r$. In the mode 2, the second outer foot inductance $L_{o2}$ operates as the magnetized inductor $L_p$ of the general LLC resonant converter, and $L_{o1}/L_c$ that the first outer foot inductance $L_{o1}$ and the middle foot inductance $L_c$ are connected to each other operates as the resonance inductor $L_r$ or the leakage inductor of the general LLC resonant converter. The mode 2 ends when the resonance operation of $L_{o1}/L_c$ that the first outer foot inductance $L_{o1}$ and the middle foot inductance $L_c$ are connected to each other and the resonance capacitor $C_r$ ends, the switch $M_2$ is turned off, and the switch $M_1$ is turned on, and the mode 1 is then repeated.

During an actual operation, the numbers of turns $N_{p1}$ and $N_{p2}$ of the first and second inductor winding parts 111 and 112 are set to be equal to each other so that the first outer foot inductance $L_{o1}$ and the second outer foot inductance $L_{o2}$ have the same value as each other, the resonance frequencies in the mode 1 and the mode 2 are set to be equal to each other.

FIGS. 7 and 8 are diagram cases in which the transformer according to an exemplary embodiment of the present disclosure is applied to half-bridge and full-bridge LLC resonant converters.

As illustrated in FIG. 7, the resonance capacitor $C_r$ and the transformer 100 may also be connected to a switching part 500 configured in a half-bridge, and as illustrated in FIG. 8, the switching part 500 may be configured in a full-bridge. In addition, the switching part 500 is able to be applied to all inverters that output an AC square wave.

As described above, the transformer according to an exemplary embodiment of the present disclosure may also be applied to the planar transformer, and may also be applied to a case in which the leakage inductance hardly occurs because the degree of magnetic coupling between the inductors is high.

In addition, the transformer and the LLC resonant converter according to an exemplary embodiment of the present disclosure may operate in the same manner as the conventional LLC resonant converter without using the separate external inductor or the large leakage inductor. Since the external inductor and the transformer which are necessarily used in the planar transformer may be operated only by a magnetic body, it is very advantageous in implementing high power density of a power conversion device.

The value of the resonance inductance and the value of the magnetized inductance may be determined by the gap $g_o$ of the outer foot of the core, the gap $g_c$ of the middle foot, the cross section areas $A_o$ and $A_c$ of the outer foot and the middle foot, and the number of turns $N_{p1}$ of the first and second inductor winding parts. Therefore, since the value of the resonance inductance and the value of the magnetized inductance may be designed according to the intent of the designer, it is possible to design the power conversion device according to a required input and output usage.

As described above, although the present disclosure has been described with reference to the embodiments and the accompanying drawings, it is to be understood that the present disclosure is not limited thereto, and various variations and modifications may be made by those skilled in the art without departing from the spirit and scope of the present disclosure as defined by the appended claims.

What is claimed is:

1. A transformer comprising:
   first and second cores configured to include a pair of outer foots and a middle foot positioned between the outer foots, and to induce a magnetic field formation;
   first and second inductor winding parts configured to include a conductor surrounding a circumference of each of the pair of outer foots of the first core, and to be connected in series with each other; and
   first and second transformer winding parts configured to include a conductor surrounding a circumference of each of the pair of outer foots of the second core,
   wherein the pair of outer foots of the first core face the pair of outer foots of the second core, the middle foot of the first core faces the middle foot of the second core, and the first core and the second core are disposed to be spaced apart from each other,
   wherein when a current is applied to the first and second inductor winding parts, the first and second inductor winding parts generate a middle foot inductance by magnetic fluxes formed in the middle foots of the first and second cores, and generate first and second outer foot inductances by magnetic fluxes formed in the outer foots of the first and second cores,
   wherein when a voltage is applied to the first and second inductor winding parts, the second outer foot inductance and the middle foot inductance operate as resonance inductors, and the first outer foot inductance operates as a magnetized inductor, and
   wherein when the voltage is not applied to the first and second inductor winding parts, the first outer foot inductance and the middle foot inductance operate as the resonance inductors, and the second outer foot inductance operates as the magnetized inductor.

2. The transformer as claimed in claim 1, wherein the middle foot inductance is determined according to a spaced distance between the middle foots of the first and second core, a cross section area of the middle foot, and a number of turns of the first and second inductor winding parts surrounding the outer foots of the first core, and the first and second outer foot inductances are determined according to a spaced distance between the outer foots of the first and second core, a cross section area of the outer foot, and the number of turns of the first and second inductor winding parts surrounding the outer foots of the first core.

3. The transformer as claimed in claim 2, wherein the number of turns of the first inductor winding part and the number of turns of the second inductor winding part are equal to each other.

* * * * *